United States Patent
Jeon et al.

(10) Patent No.: US 9,931,942 B2
(45) Date of Patent: Apr. 3, 2018

(54) METHOD AND SYSTEM FOR CONTROLLING BRAKING FORCE IN REGENERATIVE BRAKE COOPERATIVE CONTROL

(71) Applicant: Hyundai Motor Company, Seoul (KR)

(72) Inventors: Gab Bae Jeon, Gyeonggi-do (KR); Sang Hyun Shim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/960,410

(22) Filed: Dec. 6, 2015

(65) Prior Publication Data

US 2017/0066331 A1    Mar. 9, 2017

(30) Foreign Application Priority Data

Sep. 7, 2015 (KR) .................. 10-2015-0126584

(51) Int. Cl.
| | |
|---|---|
| *G06F 7/70* | (2006.01) |
| *B60L 7/18* | (2006.01) |
| *B60T 8/26* | (2006.01) |
| *B60T 8/40* | (2006.01) |
| *B60L 15/20* | (2006.01) |

(52) U.S. Cl.
CPC ............ *B60L 7/18* (2013.01); *B60L 15/2009* (2013.01); *B60L 15/2045* (2013.01); *B60T 8/26* (2013.01); *B60T 8/267* (2013.01); *B60T 8/4081* (2013.01); *B60L 2260/34* (2013.01); *B60T 2270/604* (2013.01); *B60T 2270/606* (2013.01); *Y02T 10/645* (2013.01); *Y02T 10/72* (2013.01); *Y02T 10/7283* (2013.01)

(58) Field of Classification Search
CPC ........ B60L 7/18; B60T 8/26; B60T 2270/606; B60T 8/1755; B60T 8/172; B60T 7/22; B60W 10/18; B60W 10/184
USPC ..... 701/70; 303/2, 9.75, 121, 152; 180/65.2, 180/165
See application file for complete search history.

(56) References Cited

U.S. PATENT DOCUMENTS

| | | | |
|---|---|---|---|
| 2003/0008614 A1* | 1/2003 | Hanson | H04B 7/18534 455/12.1 |
| 2003/0168266 A1* | 9/2003 | Sasaki | B60K 6/48 180/65.25 |
| 2004/0162187 A1* | 8/2004 | Suzuki | B60K 6/44 477/182 |
| 2004/0238244 A1* | 12/2004 | Amanuma | B60K 6/52 180/65.225 |

(Continued)

FOREIGN PATENT DOCUMENTS

| | | |
|---|---|---|
| JP | 1999-115738 A | 4/1999 |
| JP | 2005-178709 A | 7/2005 |

(Continued)

*Primary Examiner* — Shardul Patel
(74) *Attorney, Agent, or Firm* — Mintz Levin Cohn Ferris Glovsky and Popeo, P.C.; Peter F. Corless

(57) ABSTRACT

A method is provided for controlling braking force in regenerative brake cooperative control of an environmentally friendly vehicle that executes regenerative braking at front wheels and/or rear wheels. A brake system that independently adjusts the braking forces of the front and rear wheels is employed to distribute braking force to assure vehicle stability, to improve fuel efficiency and to have improved braking performance.

20 Claims, 7 Drawing Sheets

(56) References Cited

U.S. PATENT DOCUMENTS

| | | | |
|---|---|---|---|
| 2006/0196712 A1* | 9/2006 | Toyota | B60K 6/445 180/165 |
| 2009/0051304 A1* | 2/2009 | Muta | B60K 6/445 318/376 |
| 2011/0031804 A1* | 2/2011 | Shimada | B60T 8/266 303/2 |
| 2012/0203416 A1* | 8/2012 | Yoshimura | B60K 6/445 701/22 |
| 2015/0123456 A1* | 5/2015 | Sato | B60T 8/267 303/3 |
| 2016/0167527 A1* | 6/2016 | Jeon | B60L 7/26 701/70 |
| 2016/0264111 A1* | 9/2016 | Doi | B60T 8/1766 |

FOREIGN PATENT DOCUMENTS

| | | |
|---|---|---|
| JP | 2006-246614 | 9/2006 |
| JP | 2007-209183 A | 8/2007 |
| JP | 2008-044554 A | 2/2008 |
| JP | 2009-278840 A | 11/2009 |
| KR | 10-2005-0014067 | 12/2006 |
| KR | 10-2007-0062230 | 6/2007 |

* cited by examiner

METHOD AND SYSTEM FOR CONTROLLING BRAKING FORCE IN REGENERATIVE BRAKE COOPERATIVE CONTROL

CROSS-REFERENCE TO RELATED APPLICATION

This application claims under 35 U.S.C. § 119(a) the benefit of priority to Korean Patent Application No. 10-2015-0126584 filed on Sep. 7, 2015, the entire contents of which are incorporated herein by reference.

BACKGROUND (a) Technical Field

The present disclosure relates to a method and system for controlling braking force in regenerative brake cooperative control, and more particularly, to a method and system for controlling braking force in regenerative brake cooperative control of an environmentally friendly vehicle which executes regenerative braking at front wheels and/or rear wheels.

(b) Background Art

In general, regenerative brake cooperative control of an environmentally friendly vehicle (e.g., a hybrid vehicle, an electric vehicle or a fuel cell vehicle) in which regenerative braking is executed at both front and rear wheels differs from regenerative brake cooperative control of a conventional vehicle in which regenerative braking is executed only at front wheels.

In an environmentally friendly vehicle in which regenerative braking of only front wheels is executed, driving motors are disposed at the front wheels. Regenerative braking force is generated when the driving motor charges a battery to recover energy and such braking force acts on only the front wheels. Since a possibility of generating the spin of the vehicle is low even when the overall braking force of the front wheels is substantial due to the regenerative braking force of the front wheels, to recover the maximum amount of energy, the generation amount of regenerative braking force may be maximally increased. Further, a system for cooperative control of hydraulic braking force is configured in consideration of only regenerative braking force of the front wheels.

For an environmentally friendly vehicle in which regenerative braking may be executed at both front wheels and rear wheels, regenerating braking force is applied to the rear wheels as well as the front wheels. When regenerative braking force of the rear wheels is increased to recover a substantial amount of energy, the rear wheels are locked and a possibility of generating the spin of the vehicle is increased and, thus, an increase in regenerative braking force of such an environmentally friendly vehicle as much as in the vehicle in which regenerative braking is executed only at the front wheels is limited.

FIG. 1 is a graph illustrating braking force distribution of a conventional vehicle in which regenerative braking is executed only at front wheels according to the related art, and FIG. 2 is a graph illustrating a relationship between actual front and rear wheel braking force distribution and an ideal braking force distribution line (e.g., an ideal braking distribution line) in the vehicle in which regenerative braking is executed only at front wheels according to the related art.

As exemplarily shown in FIG. 1, regenerative braking force of the front wheels is first used to increase the recovery amount of energy and, when a braking force that exceeds front wheel regenerative braking force is necessary, hydraulic braking force is generated by applying the same hydraulic pressure to wheel brakes of the front and rear wheels.

For front wheel regenerative braking, in spite of such braking force distribution, a deceleration at which lock of the rear wheels first occurs is greater than that of a vehicle in which only a general hydraulic brake is applied, as exemplarily shown in FIG. 2, thereby not greatly reducing vehicle stability. In other words, with reference to the actual braking distribution lines, only front wheel regenerative braking force is generated up to the maximum value of front wheel regenerative braking force and, thereafter, braking forces of the front and rear wheels by the hydraulic brake is generated. This is due to a cross point with the ideal braking distribution line being formed in a deceleration region where braking force is relatively large.

The magnitude of regenerative braking force generated from the front wheels is proportional to the capacity of the driving motors, and a deceleration at which lock of the rear wheels may first occur is changed based on the capacity of the driving motors. Therefore, in an environmentally friendly vehicle in which regenerative braking of only front wheels is executed, although braking force of the front wheels is increased by front wheel regenerative braking force, vehicle stability is not reduced. Therefore, a braking force ratio of front and rear wheel hydraulic brakes may not be changed and an X-split pipe line generating the same hydraulic pressure at the front and rear wheels may be used as the pipe line of a brake system.

Furthermore, FIGS. 3 and 4 are graphs illustrating braking force distribution according to the related art where the conventional brake system and braking force distribution are applied to an environmentally friendly vehicle in which regenerative braking of rear wheels or both front and rear wheels is executed, and actual braking force distribution.

As exemplarily shown in FIGS. 3 and 4, when an environmentally friendly vehicle in which regenerative braking of rear wheels or both front and rear wheels is executed uses the above-described conventional brake system and braking force distribution, regenerative braking force of rear wheels is first used to increase the recovery amount of energy and, when a braking force that exceeds rear wheel regenerative braking force is necessary (e.g., when a deceleration equal to or greater than "A" is required), hydraulic braking force is generated by applying the same hydraulic pressure to wheel brakes of the front and rear wheels.

In particular, when regenerative braking force is maximally used to recover energy, a deceleration having a possibility of occurrence of earlier lock of the rear wheels is reduced and thus vehicle stability deteriorates and, when regenerative braking force is restricted to assure vehicle stability, the recovery amount of energy is reduced. Therefore, a regenerative brake cooperative control method which may enhance stability and braking performance of a vehicle and maximize regenerative braking to improve fuel efficiency is required.

SUMMARY

The present invention provides a method and system for controlling braking force in regenerative brake cooperative control of an environmentally friendly vehicle executing regenerative braking at front wheels and/or rear wheels, in which a brake system independently adjusting the braking forces of the front and rear wheels may be used to distribute braking force to assure vehicle stability, to improve fuel efficiency and to have improved braking performance.

In one aspect, the present invention provides a method for controlling braking force in regenerative brake cooperative control that may include distributing braking forces of front wheels and rear wheels by generating regenerative braking force of at least one of front wheels and rear wheels up to a reference deceleration during braking. In the above distribution, front wheel regenerative braking force and rear wheel regenerative braking force distributed based on a reference braking distribution ratio may be generated and, then, rear wheel regenerative braking force may be generated up to a rear wheel regenerative braking force limit.

In another exemplary embodiment, after rear wheel regenerative braking force is increased to the rear wheel regenerative braking force limit, the rate of front wheel braking force may be increased by generating front wheel hydraulic braking force. Additionally, after the rate of front wheel braking force is increased to cause the distribution ratio of front wheel braking force to rear wheel braking force to become about the same as the reference braking distribution ratio, rear wheel regenerative braking force may be generated up to a rear wheel regenerative braking force maximum value by distributing front wheel braking force and rear wheel braking force based on the reference braking distribution ratio.

In still yet another exemplary embodiment, after rear wheel regenerative braking force is generated up to the rear wheel regenerative braking force maximum value, front wheel braking force and rear wheel braking force, distributed based on the reference braking distribution ratio, may be generated.

In a further exemplary embodiment, after rear wheel regenerative braking force is generated up to the rear wheel regenerative braking force maximum value, the front wheel braking force and rear wheel braking force may be distributed and generated based on the reference braking distribution ratio. In particular, rear wheel hydraulic braking force may be generated so that front wheel braking force and rear wheel braking force, distributed based on the reference braking distribution ratio, may be generated.

The method may further include distributing braking forces of the front wheels and the rear wheels based on the reference braking distribution ratio having a designated ratio value in a braking region of more than the reference deceleration. The reference braking distribution ratio may be set to be about the same as a distribution ratio of a basic braking distribution line considering only hydraulic braking force distribution of the front wheels and the rear wheels.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
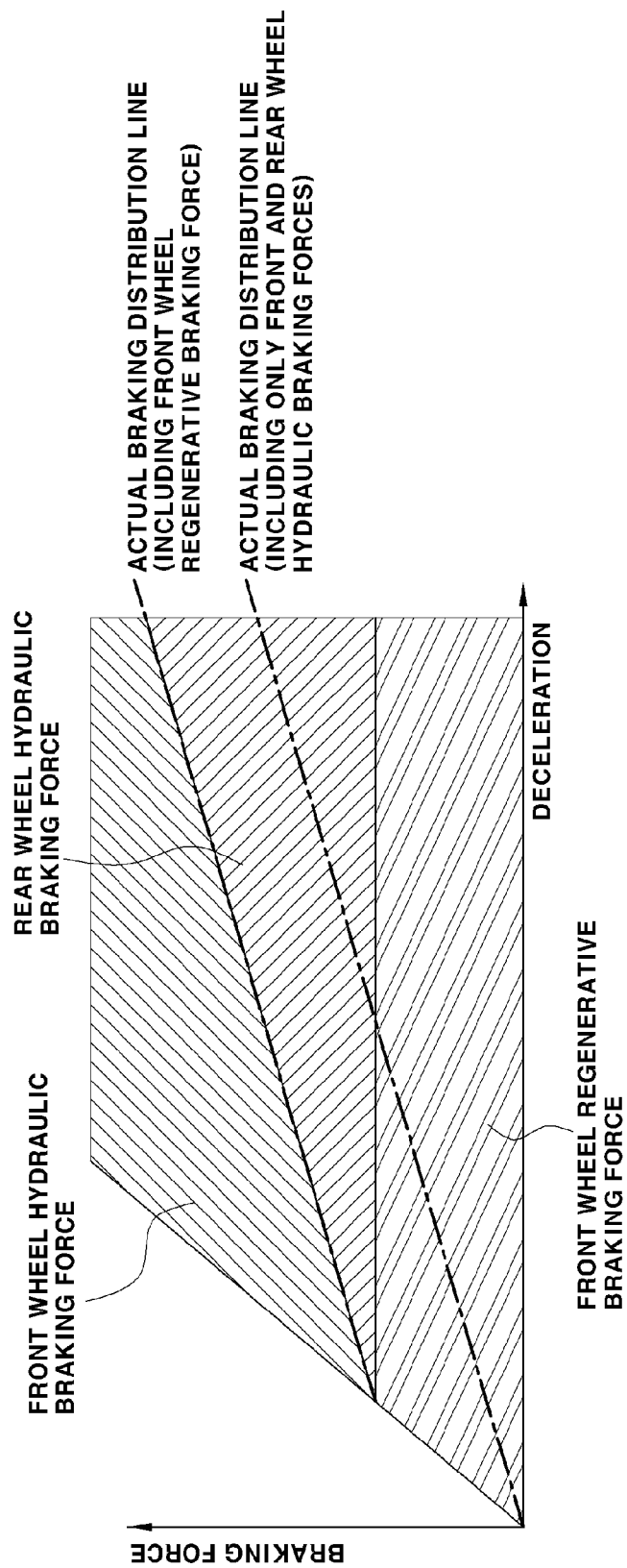
FIGS. 1 and 2 are graphs illustrating braking force distribution of a vehicle executing regenerative braking of only front wheels according to the related art.
Figure 2:
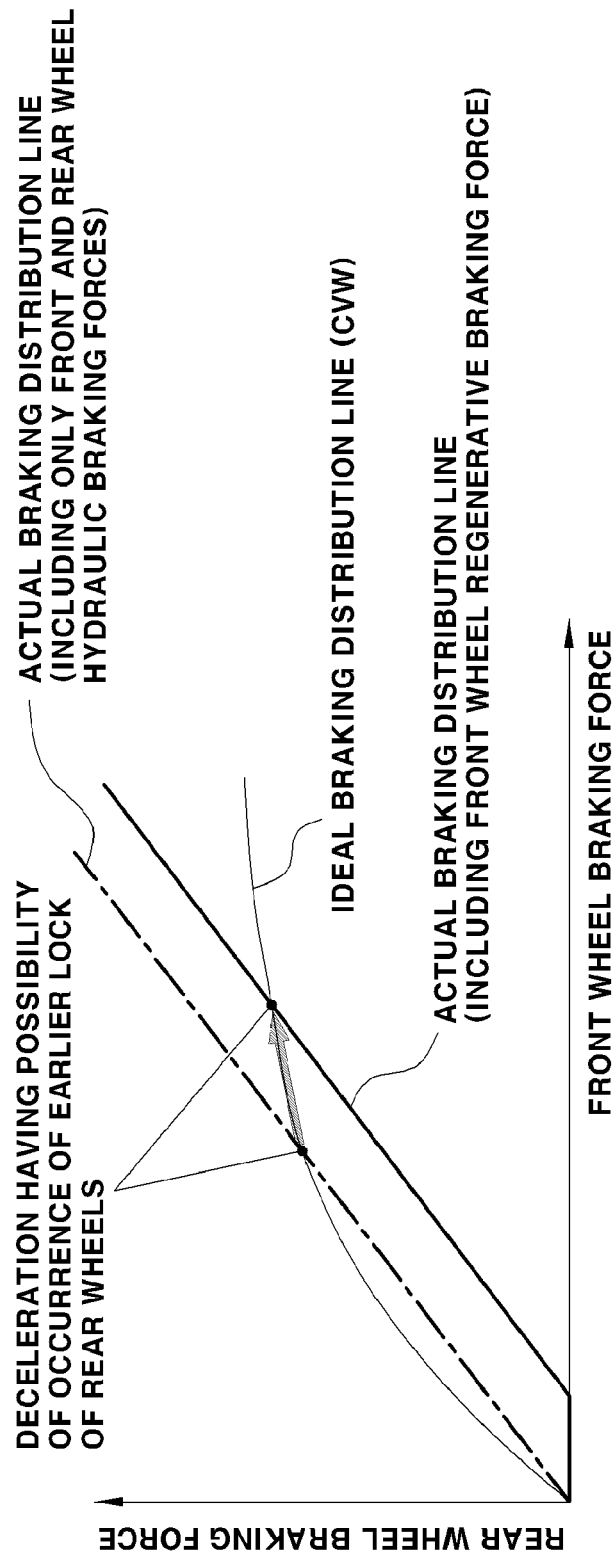
Figure 3:
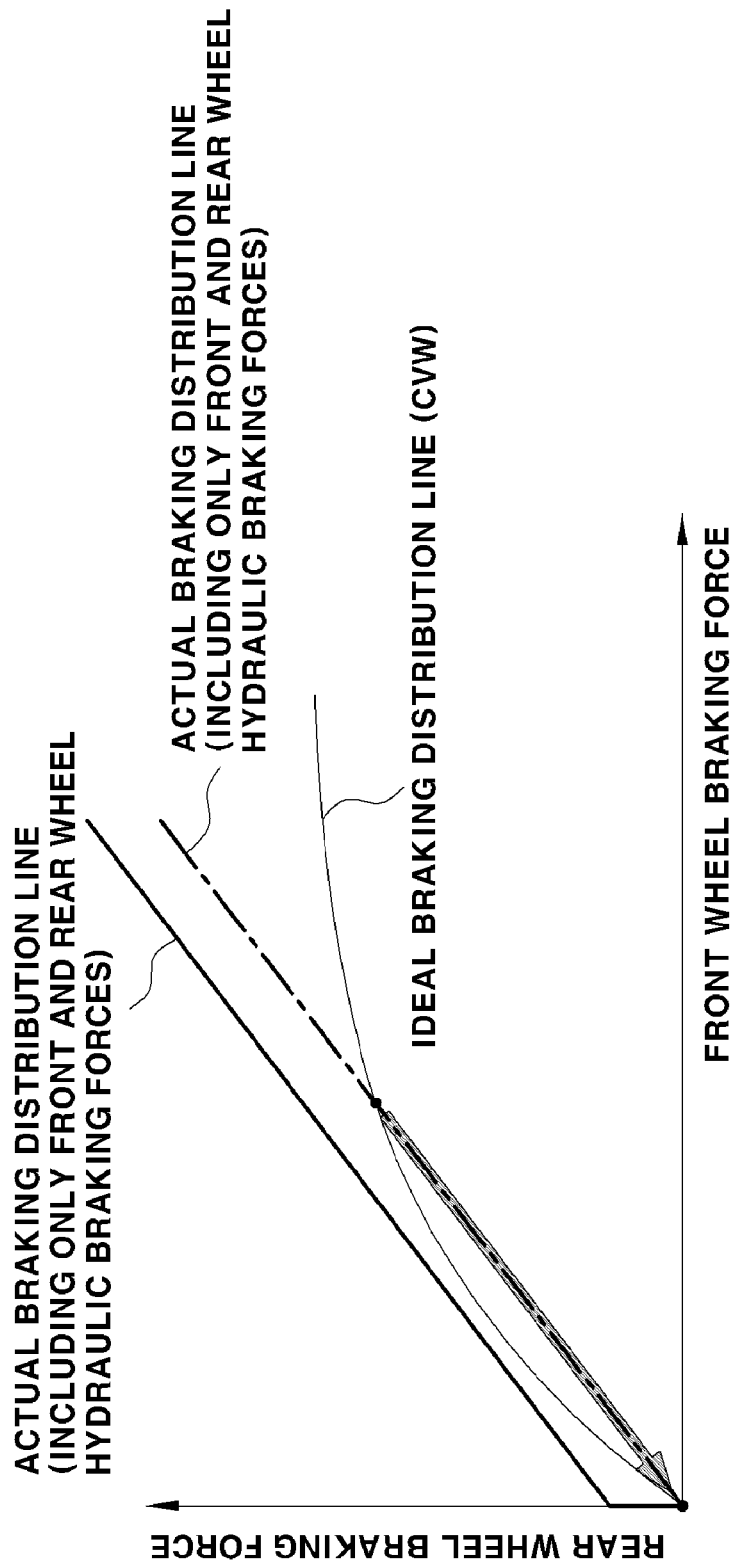
FIGS. 3 and 4 are graphs illustrating braking force distribution of a vehicle executing regenerative braking of rear wheels or both front and rear wheels, when regenerative braking force of the rear wheels is first generated according to the related art.
Figure 4:
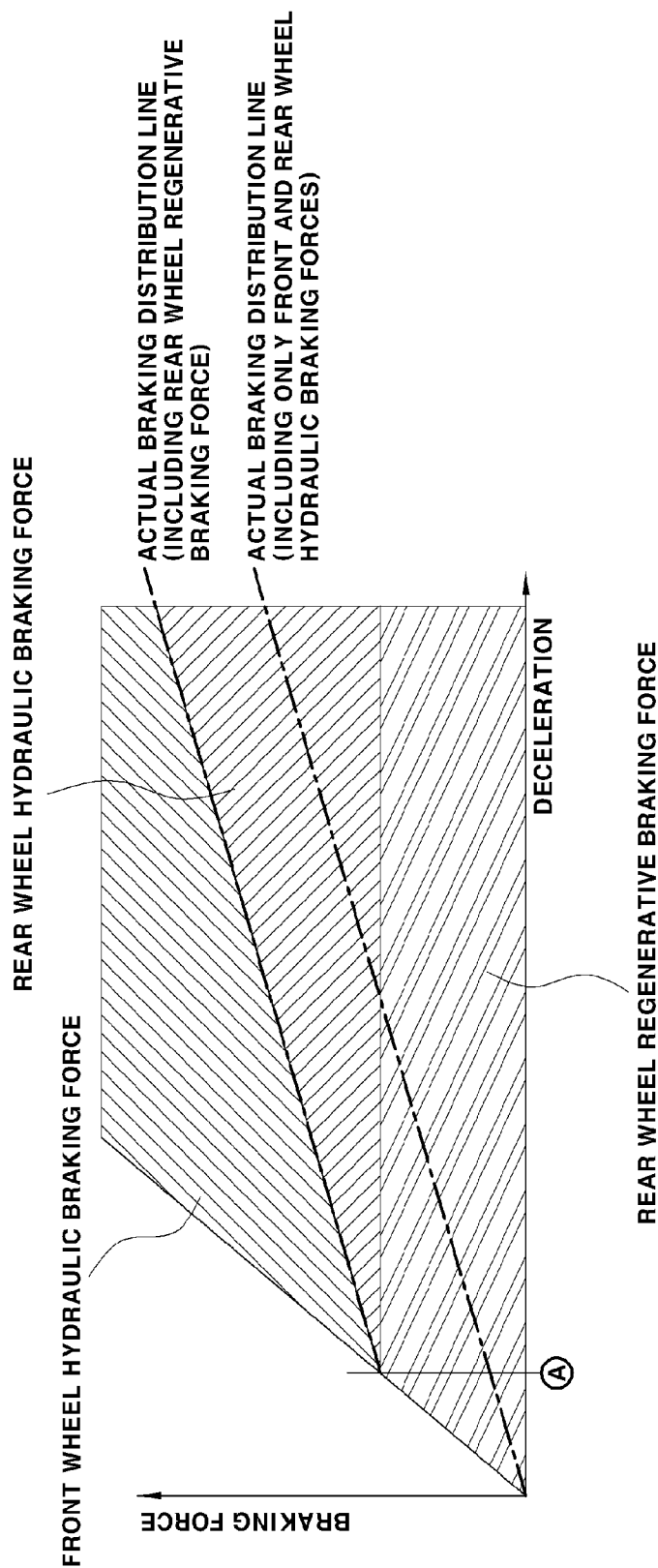

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a new type of method for controlling braking force in regenerative brake cooperative control which may satisfy vehicle stability, braking performance and fuel efficiency improvement in an environmentally friendly vehicle (e.g., a hybrid vehicle, an electric vehicle or a fuel cell vehicle) executing regenerative braking at front wheels, rear wheels or both front and rear wheels.

Throughout the specification, a basic brake system to implement such a method for controlling braking force in regenerative brake cooperative control will be schematically described. Further, based on such a brake system, a method for controlling braking force in regenerative brake cooperative control including a braking distribution method to properly distribute regenerative braking force and hydraulic braking force to front wheels and rear wheels will be described.

Figure 5:
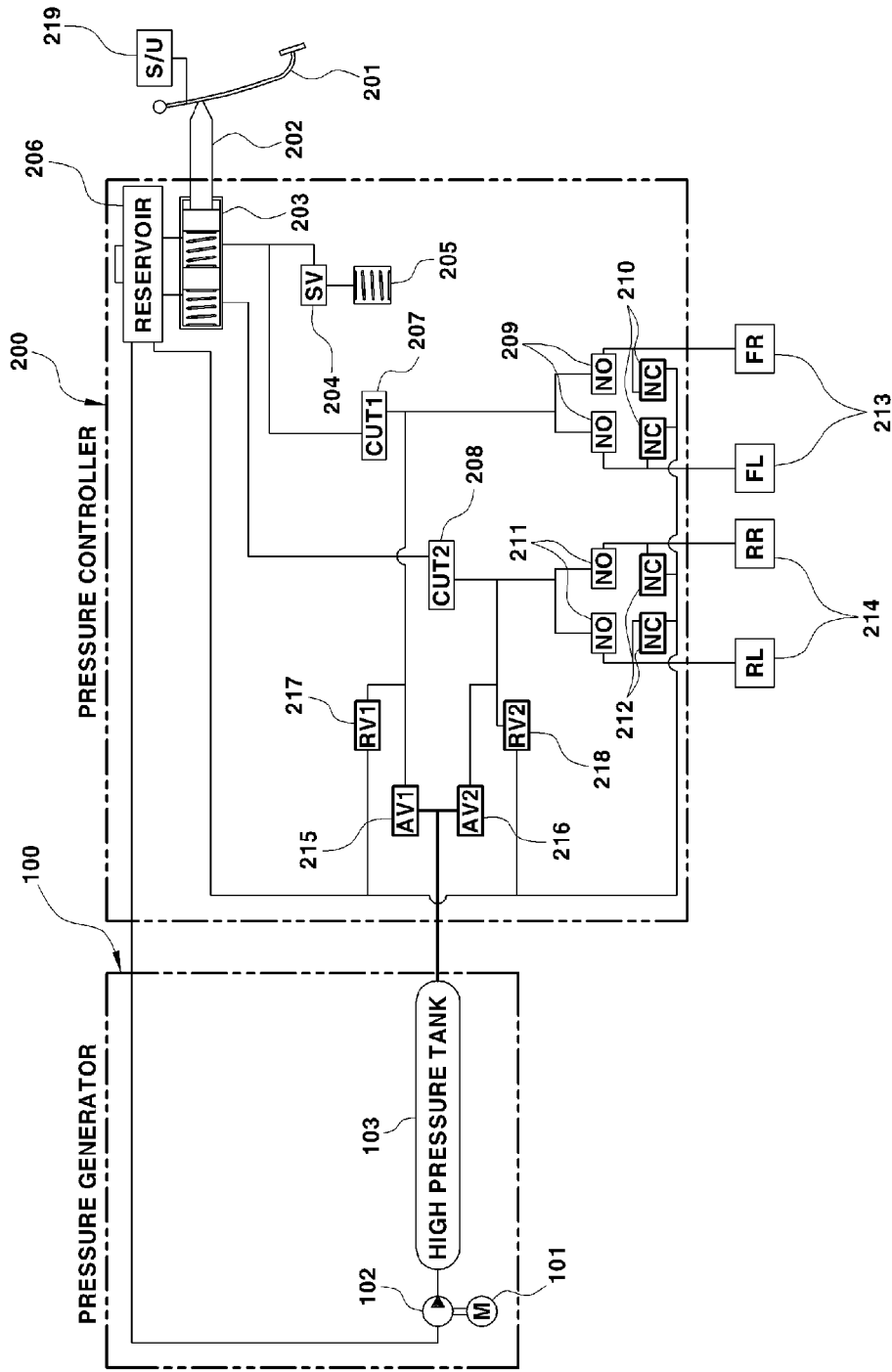
FIG. 5 is a block diagram schematically illustrating the configuration of a brake system in accordance with one exemplary embodiment of the present invention.

Although the specification exemplarily illustrates a brake system shown in FIG. 5, such a brake system is merely an example of a system for independently controlling braking forces of front wheels and rear wheels, and the method for controlling braking force in regenerative brake cooperative control in accordance with the present invention is not limited as to this brake system.

For example, the method for controlling braking force in regenerative brake cooperative control in accordance with the present invention may be applied to an electro mechanical brake (EMB) system for independently controlling braking forces of four wheels. Further, although the specification describes a method for controlling braking force in regenerative brake cooperative control in accordance with one exemplary embodiment the present invention, the inventions stated in claims are not limited as to such an exemplary embodiment and may include various exemplary embodiments within the spirit and scope of the invention.

Hereinafter, with reference to the accompanying drawings, a method for controlling braking force in regenerative brake cooperative control in accordance with the present invention will be described in detail.

FIG. 5 is a block diagram schematically illustrating the configuration of a brake system for H-split pipe lines in accordance with one exemplary embodiment of the present invention. In a method for controlling braking force in regenerative brake cooperative control in accordance with one exemplary embodiment of the present invention, independent control of braking forces of front wheels and rear wheels is required. Therefore, a system for independently controlling hydraulic pressures of the front wheels and the rear wheels is necessary, as shown in FIG. 5.

Such a system, as exemplarily shown in FIG. 5, may include a pressure generator 100 having a pump 102 driven by a motor 101 and a high pressure tank 103, and a pressure controller 200 configured to adjust pressure generated by the pressure generator 100 to adjust braking forces of respective wheels. In such a system, when a brake pedal 201 applies pressure to a master cylinder 203 through a push rod 202, information of a stroke unit 219 may be received, a simulator valve 204 may be opened, and cut valves 207 and 208 may be closed. The various components described above may be operated by an upper controller integrated with the system having a process and a memory.

When the engagement of the pedal 201 increases (e.g., further pressure is exerted onto the pedal), reaction force of the pedal 201 is generated by an elastic member, such as a spring within a pedal simulator 205. A front wheel target pressure that corresponds to a pedal stroke may open a first application valve 215 to move a flow at the side of the high pressure 103 to pipes at the side of the front wheels to generate pressure. Further, a rear wheel target pressure that corresponds to a pedal stroke may open a second application valve 216 to move a flow at the side of the high pressure 103 to pipes at the side of the rear wheels to generate pressure.

Additionally, pressures used to move (e.g., translate) to the pipes at the side of the front wheels or the rear wheels through the first and second application valves 215 and 216 form hydraulic pressures at the respective wheels by normally open valves 209 and 211. When pressure within the pipe is reduced or hydraulic pressure is released, a first release valve 217 and/or a second release valve 218 may be opened and the flow may be discharged, thereby reducing or releasing pressure. Normally closed values 210 and 212, which are not described, may be installed at the pipes at the side of the respective wheels and may be connected to a reservoir 206.

Therefore, the regenerative brake for H-split pipe lines shown in FIG. 5 may be configured to operate a pair of application valves 215 and 216 and a pair of release valves 217 and 218, to independently adjust hydraulic pressures of the front wheels and the rear wheels. Such a brake system may be used to distribute braking forces of the front wheels and the rear wheels based on braking lines set to maximize regenerative braking force within a range of suppressing that lock of the rear wheels is first generated.

The method in accordance with one exemplary embodiment of the present invention may include setting a reference deceleration, distributing braking forces of the front wheels and the rear wheels, including regenerative braking force of at least one of the front wheels and the rear wheels during braking up to a braking region of the set reference deceleration point, i.e., until the deceleration of the vehicle reaches the reference deceleration, and adjusting an increase in regenerative braking force. Further, the method may include distributing braking forces of the front wheels and the rear wheels based on a reference braking distribution ratio in the braking region that exceeds the set reference deceleration and thus, the vehicle may sufficiently assure braking force when the weight of the vehicle increases.

Figure 6:
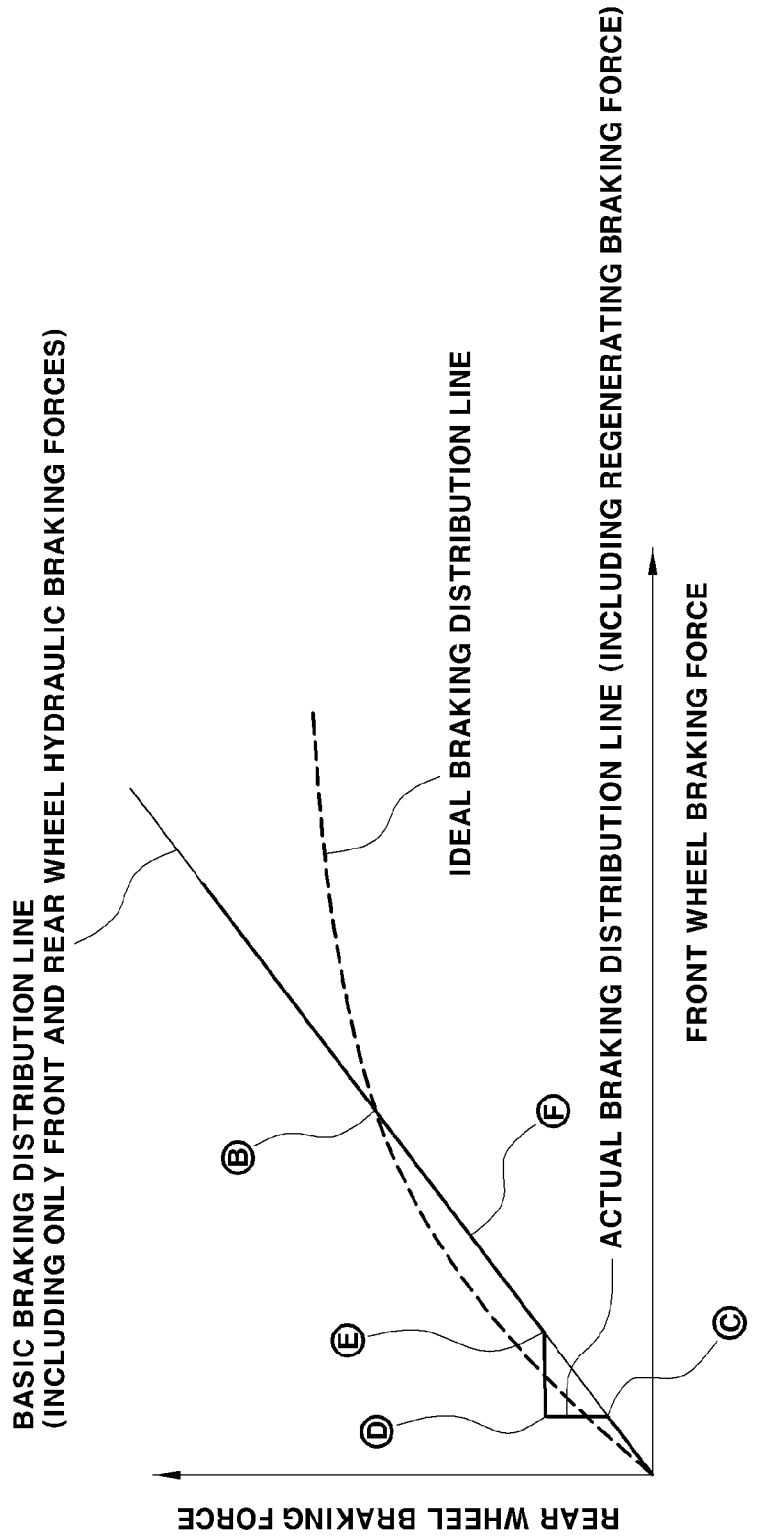
FIGS. 6 and 7 are graphs illustrating braking forces of front and rear wheels braking forces and regenerative braking force distribution in a method for controlling braking force in regenerative brake cooperative control in accordance with one exemplary embodiment of the present invention.

FIG. 6 is a graph illustrating distribution relations of front and rear wheel braking forces and regenerative braking force using such a brake system in accordance with one exemplary embodiment of the present invention. In FIG. 6, based on a reference deceleration point (point B), braking force including regenerative braking force may be distributed to the front wheels and the rear wheels before the point B (e.g., at a deceleration of less than the point B) and distribution of braking force may be determined based on distribution by brake specifications of the front wheels and the rear wheels after the point B (e.g., at a deceleration exceeding the point B).

Further, the reference deceleration point (point B) may indicate a point at which an ideal braking distribution line and a basic braking distribution line determined based on distribution by brake specifications of the front wheels and the rear wheels intersect. In particular, the straightened basic braking distribution line of FIG. 6 may be an actual braking distribution line in consideration of only hydraulic braking forces of the front wheels and the rear wheels and may have a designated ratio determined by a distribution ratio based on the brake specifications of the front wheels and the rear wheels.

Therefore, when a braking distribution ratio (e.g., a braking force distribution ratio) of the front wheels to the rear wheels in a section after the point B is set as a reference braking distribution ratio, the basic braking distribution ratio may be about the same as the braking force distribution ratio of the conventional basic braking distribution line in the related art and may be set to be a sufficient braking force distribution ratio in consideration of design elements. Braking force of a vehicle may become the maximum when four wheels of the vehicle are simultaneously stopped and braking force distribution at this time is referred to as ideal braking force distribution. The ideal braking distribution line is a line acquired by graphing ideal braking force distribution.

In distribution of braking force in accordance with the exemplary embodiment shown in FIG. 6, braking force may be distributed to the front wheels and the rear wheels along the basic braking distribution line in a region before the point B but, in some regions where regenerative braking forces of the front wheels and the rear wheels are generated, braking force may be distributed in a different manner from the basic braking distribution line. Therefore, when a braking force distribution line including regenerative braking forces of the front wheels and the rear wheels, displayed in a region before the point B, is referred to as an actual braking distribution line, rear wheel braking force in some sections of the actual braking distribution line may have a greater value than that of rear wheel braking force of the basic braking distribution line.

In other words, the actual braking distribution line and the basic braking distribution line overlap in a braking region after the point B and may have about the same braking force distribution ratio and, in some sections before the point B where the actual braking distribution line and the basic braking distribution line do not overlap, rear wheel braking force of the actual braking distribution line may be greater than rear wheel braking force of the basic braking distribution line.

Moreover, braking force distribution to the front and rear wheels, executed based on such an actual braking distribution line, will be described for each section in more detail. First, in a section up to a point C, front wheel regenerative braking force and rear wheel regenerative braking force may be distributed based on the braking force distribution ratio of the basic braking distribution line to distribute braking force in consideration of only hydraulic braking forces of the front wheels and the rear wheels (i.e., the reference braking distribution ratio). In a section from the point C to a point D, rear wheel regenerative braking force may be increased while restricted to a designated level or less to minimize a possibility of occurrence of earlier lock of the rear wheels. In a section from the point D to a point E, the rate of front wheel braking force to rear wheel braking force in the section from the point C to the point D may be increased and, in a section after the point E, rear wheel regenerative braking force may be maximally generated within a range less than the braking force distribution ratio of the actual braking distribution line. Further, at a point F, the maximum value which rear wheel regenerative braking force may reach, i.e., the maximum value of rear wheel regenerative braking force, may be generated.

Figure 7:
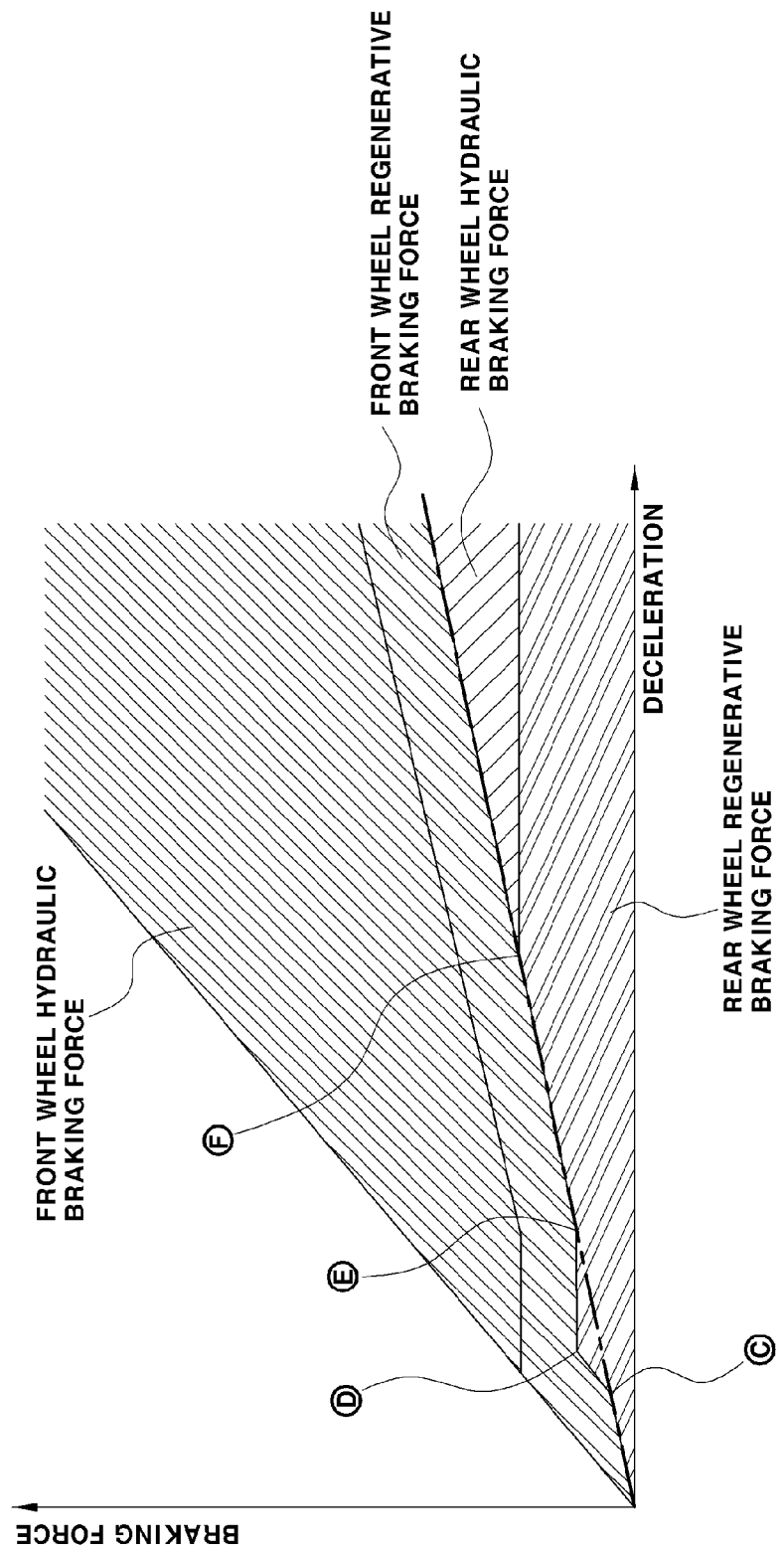

FIG. 7 is a graph illustrating distribution of overall braking force including regenerative braking forces of the front and rear wheels in accordance with the exemplary embodiment of the present invention. Overall braking force may be divided into front and rear wheel regenerative braking forces and front and rear wheel hydraulic braking forces.

In particular, with reference to FIGS. 6 and 7, from the point C to the point D, when the magnitude of rear wheel regenerative braking force is excessively increased, a possibility of earlier lock of the rear wheels on a road surface having a low coefficient of friction may increase and, thus, rear wheel regenerative braking force may be restricted to a rear wheel regenerative braking force limit of a designated level and, rear wheel braking forces in some sections exceed the ideal braking distribution line.

For example, when the coefficient of friction of a frozen road is set as a reference coefficient of friction, it may be set that lock of the front wheels occurs on a road surface having a coefficient of friction, which is the reference coefficient of friction or greater, and lock of the rear wheels may first occur on a road surface having a coefficient of friction of less than the reference coefficient of friction.

From the point D to the point E, rear wheel braking force of the point D may be maintained without increase and front wheel hydraulic braking force may be generated to increase the rate of front wheel braking force. In other words, after rear wheel regenerative braking force is increased to the rear wheel regenerative braking force limit, only front wheel hydraulic braking force may be generated to increase the rate of front wheel braking force. Particularly, at the point E, front wheel braking force and rear wheel braking force distributed at the reference braking distribution ratio may be generated.

Thereafter, after the point E, rear wheel regenerative braking force may be increased within a designated level and, at the point F, rear wheel regenerative braking force reaches the maximum value within the range less than the braking force distribution ratio of the actual braking distribution line (i.e., the basic braking distribution ratio). After the point F, braking forces of the front wheels and the rear wheels may be generated based on the actual braking distribution line.

In other words, after the rate of front wheel braking force from the point D to the point E is increased and the distribution ratio of front wheel braking force to rear wheel braking force may become about the same as the basic braking distribution ratio, front wheel braking force and rear wheel braking force may be distributed based on the reference braking distribution ratio to generate rear wheel regenerative braking force to reach the rear wheel regenerative braking force maximum value.

In the exemplary embodiment shown in FIG. 6, the actual braking distribution line may have about the same braking force distribution ratio as the reference braking distribution ratio except the section from the point C to the point E. Therefore, in the braking region before the point B, braking force distribution to the front wheels and the rear wheels may be determined by the reference braking distribution ratio except the section from the point C to the point E and braking forces of the front wheels and the rear wheels are generated based on the reference braking distribution ratio in the section from the point F to the point B.

Furthermore, after braking force distribution of the front wheels and the rear wheels becomes about the same as the reference braking distribution ratio, braking forces of the front wheels and the rear wheels may be generated at the same ratio as that of the basic braking distribution line. In other words, after rear wheel regenerative braking force is generated to reach the rear wheel regenerative braking force maximum value, front wheel braking force and rear wheel braking force may be generated based on the reference braking distribution ratio. In particular, rear wheel hydraulic braking force may be generated to distribute front wheel braking force and rear wheel braking force based on the reference braking distribution ratio. Further, in the section after the point B, hydraulic braking forces of the front wheels and the rear wheels may be generated based on the reference braking distribution ratio having a designated ratio value and, thus, braking force may be sufficiently acquired even when the weight of the vehicle is increased.

As exemplarily shown in FIG. 7, front wheel regenerative braking force and rear wheel regenerative braking force may be first generated before hydraulic braking forces of the front wheels and the rear wheels and rear wheel regenerative braking force is increased within a designated value to minimize a possibility of lock of the rear wheels, thereby improving braking stability, reducing the lowering of vehicle stability due to an increase in overall braking force of the rear wheels and increasing the recovery rate of regenerative braking energy. Further, as described above, the method in accordance with this exemplary embodiment may be applied to a brake system which may independently control braking forces of front wheels and rear wheels, such as a 4-wheel EMB system.

As is apparent from the above description, in a method for controlling braking force in regenerative brake cooperative control in accordance with the present invention, in an environmentally friendly vehicle in which regenerative braking at front wheels and/or rear wheels may be executed, braking forces of the front wheels and the rear wheels may be independently adjusted and braking force and regenerative braking force distribution to the front wheels and the rear wheels may be set, thereby distributing braking force to the front wheels and the rear wheels to reduce the range of the coefficient of friction of a road surface, at which the rear wheels is earlier locked, and generating regenerative braking force.

Therefore, in accordance with one exemplary embodiment of the present invention, vehicle stability may be assured by preventing turning of the vehicle due to lock of the rear wheels during braking and deterioration of durability and a sense of difference (e.g., for a driver) due to frequent operation of an anti-lock brake system (ABS) may be reduced by lowering a possibility of operating the ABS. Further, in accordance with the present invention, the recovery rate of regenerative braking energy may be maximized within the range of sufficiently assuring stability and braking force of the vehicle and, thus, fuel efficiency of the vehicle may be improved.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for controlling braking force in regenerative brake cooperative control, comprising:
    distributing, by a controller, braking forces of front wheels and rear wheels by generating regenerative braking force of at least one of front wheels and rear wheels up to a reference deceleration during braking, wherein front wheel regenerative braking force and rear wheel regenerative braking force, distributed based on a reference braking distribution ratio are generated and then, only the rear wheel regenerative braking force is generated up to a rear wheel regenerative braking force limit, and
    wherein the braking forces of the front wheels and the rear wheels are distributed to the front wheels and the rear wheels along the reference braking distribution ratio in a first region, and in a portion of the first region where the front regenerative braking force and the rear wheel regenerative braking force are generated, the braking forces are distributed in a different manner from the reference braking distribution ration to minimize a possibility of occurrence of earlier lock of the rear wheels.

2. The method of claim 1, wherein after rear wheel regenerative braking force is increased to the rear wheel regenerative braking force limit, the rate of front wheel braking force is increased.

3. The method of claim 1, wherein after rear wheel regenerative braking force is increased to the rear wheel regenerative braking force limit, the rate of front wheel braking force is increased by generating only front wheel hydraulic braking force.

4. The method of claim 2, wherein after the rate of front wheel braking force is increased to adjust the distribution ratio of front wheel braking force to rear wheel braking force to become about the same as the reference braking distribution ratio, rear wheel regenerative braking force is generated up to a rear wheel regenerative braking force maximum value.

5. The method of claim 2, wherein after the rate of front wheel braking force is increased to adjust the distribution ratio of front wheel braking force to rear wheel braking force to become about the same as the reference braking distribution ratio, rear wheel regenerative braking force is generated up to a rear wheel regenerative braking force maximum value by distributing front wheel braking force and rear wheel braking force based on the reference braking distribution ratio.

6. The method of claim 4, wherein after rear wheel regenerative braking force is generated up to the rear wheel regenerative braking force maximum value, front wheel braking force and rear wheel braking force are generated.

7. The method of claim 4, wherein, after rear wheel regenerative braking force is generated up to the rear wheel regenerative braking force maximum value, rear wheel hydraulic braking force is generated so that front wheel braking force and rear wheel braking force, distributed according to the reference braking distribution ratio, are generated.

8. The method of claim 1, further comprising:
    distributing, by the controller, braking forces of the front wheels and the rear wheels based on the reference braking distribution ratio having a designated ratio value in a braking region of more than the reference deceleration.

9. The method of claim 1, wherein the reference braking distribution ratio is set to be the same as a distribution ratio of a basic braking distribution line.

10. The method of claim 1, wherein a braking force distribution line including the front wheel regenerative braking force and the rear wheel regenerative braking force in the first region is defined as an actual braking distribution line, and the rear wheel braking force in some sections of the actual braking distribution line has a greater value than the rear wheel braking force of a basic braking distribution line.

11. The method of claim 10, wherein the actual braking distribution line and the basic distribution line overlap in a braking region after a predetermined point (B) and have a same braking force distribution ratio and, in some sections before the point (B) where the actual braking distribution line and the basic braking distribution line do not overlap, the rear wheel braking force of the actual braking distribution line is greater than the rear wheel braking force of the basic braking distribution line.

12. A system for controlling braking force in regenerative brake cooperative control, comprising:
  a memory configured to store program instructions; and
  a processor configured to execute the program instructions, the program instructions when executed configured to:
    distribute braking forces of front wheels and rear wheels by generating regenerative braking force of at least one of front wheels and rear wheels up to a reference deceleration during braking,
  wherein front wheel regenerative braking force and rear wheel regenerative braking force, distributed based on a reference braking distribution ratio are generated and then, only the rear wheel regenerative braking force is generated up to a rear wheel regenerative braking force limit, and
  wherein the braking forces of the front wheels and the rear wheels are distributed to the front wheels and the rear wheels along the reference braking distribution ratio in a first region, and in portion of the first region where the front regenerative braking force and the rear wheel regenerative braking force are generated, the braking forces are distributed in a different manner from the reference braking distribution ration to minimize a possibility of occurrence of earlier lock of the rear wheels.

13. The system of claim 12, wherein after rear wheel regenerative braking force is increased to the rear wheel regenerative braking force limit, the rate of front wheel braking force is increased.

14. The system of claim 12, wherein after rear wheel regenerative braking force is increased to the rear wheel regenerative braking force limit, the rate of front wheel braking force is increased by generating only front wheel hydraulic braking force.

15. The system of claim 13, wherein after the rate of front wheel braking force is increased to adjust the distribution ratio of front wheel braking force to rear wheel braking force to become about the same as the reference braking distribution ratio, rear wheel regenerative braking force is generated up to a rear wheel regenerative braking force maximum value.

16. The system of claim 13, wherein after the rate of front wheel braking force is increased to adjust the distribution ratio of front wheel braking force to rear wheel braking force to become about the same as the reference braking distribution ratio, rear wheel regenerative braking force is generated up to a rear wheel regenerative braking force maximum value by distributing front wheel braking force and rear wheel braking force based on the reference braking distribution ratio.

17. The method of claim 13, wherein after rear wheel regenerative braking force is generated up to the rear wheel regenerative braking force maximum value, front wheel braking force and rear wheel braking force are generated.

18. The method of claim 13, wherein, after rear wheel regenerative braking force is generated up to the rear wheel regenerative braking force maximum value, rear wheel hydraulic braking force is generated so that front wheel braking force and rear wheel braking force, distributed according to the reference braking distribution ratio, are generated.

19. The method of claim 12, wherein the program instructions when executed are further configured to:
  distribute braking forces of the front wheels and the rear wheels based on the reference braking distribution ratio having a designated ratio value in a braking region of more than the reference deceleration.

20. The method of claim 12, wherein the reference braking distribution ratio is set to be the same as a distribution ratio of a basic braking distribution line.

* * * * *